(12) United States Patent
Ji (10) Patent No.: US 12,069,492 B2
(45) Date of Patent: Aug. 20, 2024

(54) MONITORING METHOD AND TERMINAL DEVICE

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 623 days.

(21) Appl. No.: 17/152,637

(22) Filed: Jan. 19, 2021

(65) Prior Publication Data

US 2021/0144571 A1    May 13, 2021

Related U.S. Application Data (63) Continuation of application No. PCT/CN2019/096733, filed on Jul. 19, 2019.

(30) Foreign Application Priority Data

Jul. 20, 2018    (CN) .......................... 201810806640.X (51) Int. Cl.
  H04W 24/08    (2009.01)
  H04W 72/53    (2023.01)

(52) U.S. Cl.
  CPC ........... *H04W 24/08* (2013.01); *H04W 72/53* (2023.01)

(58) Field of Classification Search
  CPC .................................................. H04W 24/08
  See application file for complete search history.

(56) References Cited

U.S. PATENT DOCUMENTS

| | | | |
|---|---|---|---|
| 9,853,781 B2 | 12/2017 | Skov et al. | |
| 2012/0281576 A1 | 11/2012 | Yamada | |
| 2012/0281667 A1 | 11/2012 | Chang | |
| 2013/0039302 A1 | 2/2013 | Miki | |
| 2013/0194947 A1 | 8/2013 | Ehsan et al. | |
| 2015/0124788 A1 | 5/2015 | Jang | |
| 2015/0215944 A1 | 7/2015 | Kim et al. | |
| 2015/0245219 A1* | 8/2015 | Wei .................. | H04B 7/2656 370/336 |
| 2016/0157213 A1 | 6/2016 | Takeda | |

(Continued)

FOREIGN PATENT DOCUMENTS

| | | |
|---|---|---|
| CN | 101959249 A | 1/2011 |
| CN | 102098148 A | 6/2011 |
| CN | 102395207 A | 3/2012 |

(Continued)

OTHER PUBLICATIONS

3GPP TSG-RAN WG1 Meeting #93, Busan, Korea, May 21-May 25, 2018, R1-1806550; Source: Intel Corporation; Title: Remaining details on CORESET and search space; Agenda item: 7.1.3.1.2 (Year: 2018).*

(Continued)

*Primary Examiner* — Abdeltif Ajid
(74) *Attorney, Agent, or Firm* — Brooks Kushman P.C.

(57) ABSTRACT

A monitoring method and a terminal device are provided. The monitoring method includes: monitoring a PDCCH based on information of an activated target object, where the target object is a carrier or a cell and a PDCCH processing capability of the terminal device is allocated between the activated target objects.

20 Claims, 2 Drawing Sheets

Monitor a PDCCH based on information of an activated target object — 101

(56) References Cited

U.S. PATENT DOCUMENTS

2018/0192408 A1 7/2018 Pelletier et al.
2021/0058189 A1* 2/2021 Xiao ................ H04L 1/0038

FOREIGN PATENT DOCUMENTS

| CN | 102640556 | A | | 8/2012 | |
|---|---|---|---|---|---|
| CN | 103796287 | A | | 5/2014 | |
| CN | 105284151 | A | | 1/2016 | |
| CN | 110740512 | A | * | 1/2020 | ........... H04L 5/0053 |
| EP | 2509378 | A1 | | 10/2012 | |
| JP | 2015512184 | A | | 4/2015 | |
| WO | 2011132960 | A2 | | 10/2011 | |

OTHER PUBLICATIONS

3GPP TSG RAN WG1 Meeting #94, Gothenburg, Sweden, Aug. 20-Aug. 24, 2018, R1-1809426, Source: Qualcomm Incorporated. Title: Maintenance for physical downlink control channel, Agenda item: 7.1.3.1 (Year: 2018).*
Chinese Office Action dated Aug. 11, 2021 as received in application No. 201810806640.X.
"Remaining details on CORESET and search space" 3GPP TSG-RAN WG1 Meeting #93, R1-1806550, Busan, Korea, May 21, 2018. Intel Corporation.
"Summary of Bandwidth Part Remaining Issues" 3GPP TSG RAN WG1 Meeting #92bis, R1-1807801, Sanya, China, Apr. 16, 2018. MediaTek inc.
European Search Report dated Sep. 3, 2021 as received in application No. 19837156.9.
Singapore Office Action dated Nov. 8, 2022 as received in application No. 11202100207X.
Nokia, Remaining details on Search Space, R1-1805517, 3GPP TSG RAN WG1 #92bis, Sanya, China Apr. 16-20, 2018.
Vivo, Remaining issues on PDCCH, R1-1808224, 3GPP TSG RAN WG1 Meeting #94, Gothenburg, Sweden, Aug. 20-24, 2018.
Japanese Office Action issued in corresponding application No. 2021-524095, dated Feb. 21, 2022 .
Chinese Office Action dated Apr. 26, 2021 as received in application No. 201810806640.X.
Written Opinion and International Search Report dated Jan. 26, 2021 as received in application No. PCT/CN2019/096733.
First Office Action for Korean Application No. 10-2021-7004941, dated Feb. 26, 2024, 5 Pages.
ZTE "Remaining issue for BWP" 3GPP TSG RAN WG1 Meeting #93, Busan, Korea, May 2018, R1-1806135, 7 Pages.

* cited by examiner

MONITORING METHOD AND TERMINAL DEVICE

CROSS-REFERENCE TO RELATED APPLICATIONS

This application is a continuation application of International Application No. PCT/CN2019/096733 filed on Jul. 19, 2019, which claims priority to Chinese Patent Application No. 201810806640.X filed in China on Jul. 20, 2018, both disclosures of which are incorporated herein by reference in their entireties.

TECHNICAL FIELD

This disclosure relates to the field of communications technologies, and in particular, to a monitoring method and a terminal device.

BACKGROUND

A new radio (New Radio, NR) system using a 5th Generation (5th-Generation, 5G) mobile communications technology can support carrier aggregation (Carrier Aggregation, CA), and can configure and activate a plurality of carriers (Component Carrier, CC) or cells for a terminal device such as user equipment (User Equipment, UE). For each CC or cell, the UE can be configured with a plurality of bandwidth parts (Bandwidth Part, BWP), and different BWPs may have same or different subcarrier spacing (Subcarrier Spacing, SCS). In addition, the NR system can also support flexible configuration of a physical downlink control channel (Physical Downlink Control Channel, PDCCH) for the BWPs of each CC or cell, and allocate a quantity of PDCCH candidates and a quantity of non-overlapping control channel elements (Control Channel Element, CCE) among the plurality of CCs or cells based on a quantity of configured CCs or cells, to monitor the PDCCH.

When a single carrier mode or a self-scheduling mode with CA is configured for the UE, a plurality of control resource sets CORESETs and a plurality of search space sets can be configured in each CC or cell. The search space sets may include common search space (Common Search Space, CSS) and UE-specific search space (UE-specific Search Space, USS). A network side can flexibly configure a quantity of blind detection for each search space set, and the CORESET may be flexibly associated with the search space set.

If channel quality is not satisfactory or a channel blocking probability is relatively high in some cells, the network side may configure cross-carrier scheduling for the UE. To be specific, a control channel is configured in another cell with better channel quality (for example, a primary cell (Primary Cell, PCell)), to schedule data in another cell (for example, a secondary cell (Secondary Cell, SCell)) across carriers. SCS of a scheduling cell (Scheduling Cell) may be same as or different from that of a scheduled cell (Scheduled Cell). The scheduling cell may be in the self-scheduling mode in which the cell schedules only itself. If the cross-carrier scheduling is configured for the scheduling cell, the scheduling cell may further schedule one or more scheduled cells besides itself. The scheduled cell does not possess a PDCCH and can be scheduled only by the scheduling cell.

To reduce implementation complexity of the UE, the NR system specifies a maximum processing capability of the UE for blindly detecting a PDCCH of the CC or the cell. The capability includes two parts: a maximum quantity of PDCCH candidates for blind detection in one slot (slot) and a maximum quantity of channel estimation required by the UE to perform blind detection, namely, a quantity of non-overlapping CCEs. A maximum PDCCH processing capability of the UE is related to SCS of a CC or a cell that is to be blindly detected. That is, the UE has a different PDCCH processing capability in a slot in different SCS. In addition, the UE can also report a maximum blind detection capability Y supported by the UE during CA. If a quantity of cells configured by the network side exceeds the capability Y reported by the UE, the NR system can support allocation of the PDCCH processing capability of the UE among the plurality of configured cells.

When the UE is configured with the plurality of cells or CCs, an NR system in a related art supports allocation of the PDCCH processing capability of the UE among the plurality of configured cells or CCs. In addition, the NR system in the related art also supports activation (activate) or deactivation (deactivate) of the SCell. For a deactivated SCell, the UE does not need to monitor a PDCCH of the SCell. However, if the PDCCH processing capability of the UE is still allocated based on the plurality of configured cells or CCs, the PDCCH processing capability of the UE is wasted and opportunities of scheduling the UE are reduced.

SUMMARY

In order to resolve the foregoing technical problem, according to a first aspect, an embodiment of this disclosure provides a monitoring method, applied to a terminal device and including:

monitoring a PDCCH based on information of an activated target object, where the target object is a carrier or a cell and a PDCCH processing capability of the terminal device is allocated between the activated target objects.

According to a second aspect, an embodiment of this disclosure further provides a terminal device, including:

a monitoring module, configured to monitor a PDCCH based on information of an activated target object, where the target object is a carrier or a cell and a PDCCH processing capability of the terminal device is allocated between the activated target objects.

According to a third aspect, an embodiment of this disclosure further provides a terminal device, including a memory, a processor, and a computer program stored in the memory and capable of running on the processor, where when the computer program is executed by the processor, the steps of the foregoing monitoring method are implemented.

According to a fourth aspect, an embodiment of this disclosure further provides a computer-readable storage medium, where the computer-readable storage medium stores a computer program, and when the computer program is executed by a processor, the steps of the foregoing monitoring method are implemented.

DESCRIPTION OF EMBODIMENTS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

Figure 1:
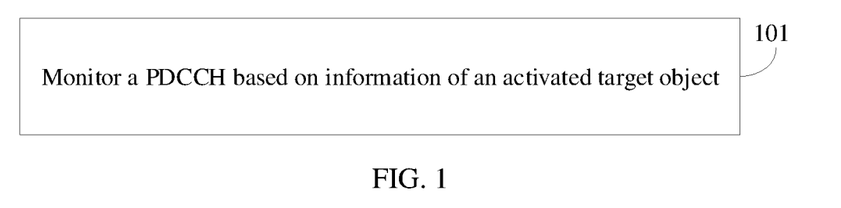
FIG. 1 is a flowchart of a monitoring method according to an embodiment of this disclosure.

As shown in FIG. 1, an embodiment of this disclosure provides a monitoring method, applied to a terminal device and including the following step:

Step 101: Monitor a PDCCH based on information of an activated target object.

Optionally, the target object may be a carrier or a cell.

In the monitoring method in this embodiment of this disclosure, the PDCCH is monitored based on the information of the activated target object, the target object is the carrier or the cell, and a PDCCH processing capability of the terminal device can be allocated between activated target objects. In this way, a deactivated target object may be prevented from occupying the PDCCH processing capability of the terminal device, the PDCCH processing capability of the terminal device may be fully utilized, resource allocation control is maximized, a blocking probability of control channel allocation is reduced, and the processing capability of the terminal device is ensured not to be overwhelmed.

In this embodiment of this disclosure, when the terminal device is configured with a plurality of cells, for any cell, SCS of the cell may be determined based on an activated downlink BWP of the cell. The terminal device monitors the PDCCH only on a search space set of an activated cell if the activated cell is not scheduled by another activated cell across carriers. However, if an activated cell is scheduled by another activated cell across carriers, the terminal device monitors the PDCCH only on a search space set that is of a scheduling cell of the activated cell and that is associated with the activated cell, and/or on a PDCCH candidate that is associated with the activated cell. Optionally, step 101 may include:

monitoring the PDCCH on a search space set of a first activated cell when the first activated cell is not scheduled by another activated cell across carriers; or when a second activated cell is scheduled by another activated cell across carriers, monitoring the PDCCH on a search space set that is of a scheduling cell of the second activated cell and that is associated with the second activated cell, and/or a PDCCH candidate that is associated with the second activated cell.

In this way, the PDCCH is selectively monitored, thereby implementing correct and efficient monitoring of the PDCCH.

In this embodiment of this disclosure, optionally, step 101 may include:

determining, by the terminal device, a PDCCH monitoring processing capability based on a quantity of activated target objects.

The PDCCH monitoring processing capability may include: a maximum PDCCH monitoring processing capability of the terminal device, and/or a maximum PDCCH monitoring processing capability for each target object in the activated target objects. The maximum PDCCH monitoring processing capability of the terminal device usually indicates a maximum PDCCH monitoring processing capability in unit time (for example, a slot).

Optionally, step 101 may include:

allocating and/or monitoring, by the terminal device, a search space set and/or a PDCCH candidate of all activated target objects based on the quantity of activated target objects and/or a sequence of identifiers of the activated target objects.

It may be understood that such allocation and/or monitoring situation may be classified as any one of the following:

allocating and/or monitoring, by the terminal device, the search space set of all the activated target objects based on the quantity of activated target objects;

allocating and/or monitoring, by the terminal device, the PDCCH candidate of all the activated target objects based on the quantity of activated target objects;

allocating and/or monitoring, by the terminal device, the search space set of all the activated target objects based on the sequence of the identifiers of the activated target objects;

allocating and/or monitoring, by the terminal device, the PDCCH candidate of all the activated target objects based on the sequence of the identifiers of the activated target objects;

allocating and/or monitoring, by the terminal device, the search space set of all the activated target objects based on the quantity of activated target objects and the sequence of the identifiers of the activated target objects;

allocating and/or monitoring, by the terminal device, the PDCCH candidate of all the activated target objects based on the quantity of activated target objects and the sequence of the identifiers of the activated target objects;

allocating and/or monitoring, by the terminal device, the search space set and the PDCCH candidate of all the activated target objects based on the quantity of activated target objects;

allocating and/or monitoring, by the terminal device, the search space set and the PDCCH candidate of all the activated target objects based on the sequence of the identifiers of the activated target objects; or allocating and/or monitoring, by the terminal device, the search space set and the PDCCH candidate of all the activated target objects based on the quantity of activated target objects and the sequence of the identifiers of the activated target objects.

Further, optionally, when the activated target objects have same SCS, the maximum PDCCH monitoring processing capability of the terminal device may be:

$$\min(S, Y) \times P.$$

S is the quantity of activated target objects, Y is a supported blind detection capability reported by the terminal device, and P is a maximum quantity of PDCCH candidates (refer to Table 1 below) that are to be blindly detected in a slot (slot) (which is, for example, specified in a protocol) or a maximum quantity of non-overlapping CCEs (refer to Table 2 below) required by the terminal device to perform blind detection.

Further, optionally, when the activated target objects have different SCS, the maximum PDCCH monitoring processing capability of the terminal device may be:

$$\min\{S \times P, \lfloor Y \times P \times S^{\mu} / \Sigma_{\mu=0}^{3} S^{\mu} \rfloor\}.$$

S is the quantity of activated target objects, Y is a supported blind detection capability reported by the terminal device, P is a maximum quantity of PDCCH candidates (refer to Table 1 below) that are to be blindly detected in a slot (slot) (which is, for example, specified in a protocol) or a maximum quantity of non-overlapping CCEs (refer to Table 2 below) required by the terminal device to perform blind detection, $\mu$ is SCS configuration supported by the terminal device, and $S^\mu$ is a quantity of target objects of each SCS configuration $\mu$.

It should be noted that the SCS of the activated target object may be determined based on an activated downlink BWP of the activated target object. The SCS configuration supported by the terminal device may be 0, 1, 2, or 3. When a single target object (such as a cell) has different SCS configuration $\mu$, a maximum quantity p1 of PDCCH candidates in each slot may be shown in Table 1 below:

TABLE 1

| $\mu$ | p1 |
|---|---|
| 0 | 44 |
| 1 | 36 |
| 2 | 22 |
| 3 | 20 |

However, when a single target object (such as a cell) has different SCS configuration $\mu$, a maximum quantity p2 of non-overlapping CCEs in each slot (that is, the maximum quantity of non-overlapping CCEs required by the terminal device to perform blind detection) may be shown in Table 2 below:

TABLE 2

| $\mu$ | p2 |
|---|---|
| 0 | 56 |
| 1 | 56 |
| 2 | 48 |
| 3 | 32 |

In this embodiment of this disclosure, optionally, when receiving state change indication signaling of a first target object at a first moment, the terminal device may start monitoring the PDCCH (or performing PDCCH blind detection) from a second moment based on the information of the activated target object after a state change of the first target object. However, before the second moment, PDCCH blind detection behavior can be maintained unchanged.

In this way, the PDCCH is selectively monitored, thereby implementing correct and efficient monitoring of the PDCCH.

It may be understood that the second moment may be any moment later than the first moment.

Specifically, the second moment may be determined based on the first moment and at least one of the following: state change delay of the first target object, response delay of the state change indication signaling, and first preset delay.

The first preset delay may be preset based on an actual condition. For example, the first preset delay may be 0 S, 0.1 S, or the like. Optionally, the second moment may be any of the following:

the first moment (that is, a sum of the first moment and preset delay 0 S), a sum of the first moment and the state change delay, a response delay (that is, a sum of the first moment and the response delay) of the state change indication signaling, a sum of the first moment, the response delay, and the state change delay, and a sum of the first moment, the response delay, the state change delay, and the first preset delay.

Optionally, the state change indication signaling can be any one of the following:

activation signaling, deactivation signaling, and signaling used to indicate a change of an activated downlink BWP of the first target object.

For example, when UE1 is configured with N cells and S (less than N) cells are activated, if the UE1 receives activation signaling for a cell 1 at a moment n1, the UE1 can maintain PDCCH blind detection behavior for another cell other than the cell 1 unchanged before a moment n2.

In other words, the UE1 still determines the maximum PDCCH monitoring processing capability of the UE1 and/or the maximum PDCCH monitoring processing capability in each activated cell based on the quantity of activated cells before the cell 1 is activated; and/or, the UE1 allocates, maps, and/or monitors a search space set or a PDCCH candidate of another cell based on the quantity of activated cells (and/or the sequence of the identifiers IDs of the activated cells) before the cell 1 is activated.

However, the UE1 may start performing PDCCH blind detection from the moment n2 based on the information of the activated cell after the activation signaling takes effect.

In other words, the UE1 determines the maximum PDCCH monitoring processing capability of the UE1 and/or the maximum PDCCH monitoring processing capability in each activated cell based on the quantity of activated cells after the cell 1 is activated; and/or, the UE1 allocates, maps, and/or monitors a search space set or a PDCCH candidate of all activated cells based on the quantity of activated cells (and/or the sequence of the IDs of the activated cells) after the cell 1 is activated.

It should be noted that, if it is assumed that activation delay of the cell 1 is k1 and response delay of activation signaling is y1, the moment n2 can be any one of the following: n1, n1+k, n1+y1, and n1+k+y1.

Alternatively, if the UE1 receives deactivation signaling for a cell 2 at a moment n3, the UE1 can maintain PDCCH blind detection behavior for another cell other than the cell 2 unchanged before a moment n4.

In other words, the UE1 still determines the maximum PDCCH monitoring processing capability of the UE1 and/or the maximum PDCCH monitoring processing capability in each activated cell based on the quantity of activated cells before the cell 2 is deactivated; and/or, the UE1 allocates, maps, and/or monitors a search space set or a PDCCH candidate of another cell based on the quantity of activated cells (and/or the sequence of the IDs of the activated cells) before the cell 2 is deactivated.

However, the UE1 may start performing PDCCH blind detection from the moment n4 based on the information of the activated cell after the deactivation signaling takes effect.

In other words, the UE1 still determines the maximum PDCCH monitoring processing capability of the UE1 and/or the maximum PDCCH monitoring processing capability in each activated cell based on the quantity of activated cells before the cell 2 is deactivated; and/or, the UE1 allocates, maps, and/or monitors a search space set or a PDCCH candidate of another cell based on the quantity of activated cells (and/or the sequence of the IDs of the activated cells) before the cell 2 is deactivated.

It should be noted that, if it is assumed that deactivation delay of the cell 2 is k2 and response delay of deactivation signaling is y2, the moment n4 can be any one of the following: n3, n3+k2, n3+y2, and n3+k2+y2.

Alternatively, if the UE1 receives DCI used to indicate a change of an activated downlink BWP1 (for example, indicating switching to a new BWP2) for an activated cell 3 at a moment n5, the UE1 can maintain PDCCH blind detection behavior for another activated cell other than the cell 3 unchanged before a moment n6.

In other words, the UE1 still determines SCS of the cell 3 based on SCS of the previous BWP1, and further determines the maximum PDCCH monitoring processing capability of the UE1 and/or the maximum PDCCH monitoring processing capability in each activated cell based on the quantity of activated cells; and/or, the UE1 determines the quantity of activated cells (and/or the sequence of the IDs of the activated cells) of each type of SCS based on the SCS of the previous BWP1, and further allocates, maps, and/or monitors a search space set or a PDCCH candidate of another activated cell.

However, the UE1 may start performing PDCCH blind detection from the moment n6 based on SCS of the new BWP2 after the DCI takes effect.

In other words, the UE1 determines SCS of the cell 3 based on the SCS of the new BWP2, and further determines the maximum PDCCH monitoring processing capability of the UE1 and/or the maximum PDCCH monitoring processing capability in each activated cell based on the quantity of activated cells; and/or, the UE1 determines the quantity of activated cells (and/or the sequence of the IDs of the activated cells) of each type of SCS based on the SCS of the new BWP2, and further allocates, maps, and/or monitors a search space set or a PDCCH candidate of each activated cell.

It should be noted that, if it is assumed that handover or effective delay of the BWP is r, r can be equal to a time domain location of the new BWP2 indicated by the DCI or can be equal to delay for the UE1 to switch to the new BWP2 to receive data, and the response delay of the DCI is y3, a moment n6 may be any one of the following: n5, n5+r, n5+y3, and n5+r+y3.

In this embodiment of this disclosure, optionally, when a state timer of a second target object expires at a third moment, the terminal device may start monitoring the PDCCH (or performing PDCCH blind detection) from a fourth moment based on the information of the activated target object after a state change of the second target object. However, before the fourth moment, PDCCH blind detection behavior can be maintained unchanged.

It may be understood that the fourth moment may be any moment later than the third moment.

Specifically, the fourth moment may be determined based on the third moment and at least one of the following:

state change delay of the second target object and second preset delay.

The second preset delay may be preset based on an actual condition. For example, the second preset delay may be 0 S, 0.1 S, or the like. Optionally, the fourth moment may be any of the following:

the third moment (that is, a sum of the third moment and preset delay 0 S), a sum of the third moment and the state change delay, and a sum of the third moment, the state change delay, and the second preset delay.

For example, when UE2 is configured with M cells and H (less than M) cells are activated, if a deactivation timer (deactivation timer) of the cell 1 expires at a moment s1, the UE2 can maintain PDCCH blind detection behavior for another cell other than the cell 1 unchanged before a moment s2.

In other words, the UE2 still determines the maximum PDCCH monitoring processing capability of the UE2 and/or the maximum PDCCH monitoring processing capability in each activated cell based on the quantity of activated cells before the cell 1 is deactivated; and/or, the UE2 allocates, maps, and/or monitors a search space set or a PDCCH candidate of another cell based on the quantity of activated cells (and/or the sequence of the IDs of the activated cells) before the cell 1 is deactivated.

However, the UE2 may start performing PDCCH blind detection from the moment s2 based on the information of the activated cell after the cell 1 is deactivated.

In other words, the UE2 determines the maximum PDCCH monitoring processing capability of the UE2 and/or the maximum PDCCH monitoring processing capability in each activated cell based on the quantity of activated cells after the cell 1 is deactivated; and/or, the UE2 allocates, maps, and/or monitors a search space set or a PDCCH candidate of all activated cells based on the quantity of activated cells (and/or the sequence of the IDs of the activated cells) after the cell 1 is deactivated.

It should be noted that, if it is assumed that the deactivation delay of the cell 1 is x, the moment s2 can be: s or s1+x.

Alternatively, if a non-active timer (for example, indicating that the previous activated downlink BWP1 is switched to the new BWP2) of an activated cell 2 expires at a moment s3, the UE2 can maintain PDCCH blind detection behavior for another activated cell other than the cell 2 unchanged before a moment s4.

In other words, the UE2 still determines SCS of the cell 2 based on SCS of the previous BWP1, and further determines the maximum PDCCH monitoring processing capability of the UE2 and/or the maximum PDCCH monitoring processing capability in each activated cell based on the quantity of activated cells; and/or, the UE2 determines the quantity of activated cells (and/or the sequence of the IDs of the activated cells) of each type of SCS based on the SCS of the previous BWP1, and further allocates, maps, and/or monitors a search space set or a PDCCH candidate of another activated cell.

However, the UE2 may start performing PDCCH blind detection from the moment s4 based on SCS of the new BWP2.

In other words, the UE2 determines SCS of the cell 2 based on the SCS of the new BWP2, and further determines the maximum PDCCH monitoring processing capability of the UE2 and/or the maximum PDCCH monitoring processing capability in each activated cell based on the quantity of activated cells; and/or, the UE2 determines the quantity of activated cells (and/or the sequence of the IDs of the activated cells) of each type of SCS based on the SCS of the new BWP2, and further allocates, maps, and/or monitors a search space set or a PDCCH candidate of each activated cell.

It should be noted that, if it is assumed that handover or effective delay of the BWP is r, and r can be equal to a time domain location of the new BWP2 or can be equal to delay for the UE2 to switch to the new BWP2 to receive data, a moment s4 may be: s3 or s3+r.

The foregoing embodiment describes the monitoring method in this disclosure, and the following describes a terminal device in this disclosure with reference to the embodiments and the drawings.

Figure 2:
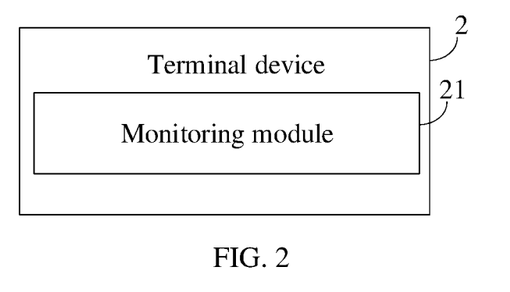
FIG. 2 is a schematic structural diagram 1 of a terminal device according to an embodiment of this disclosure.

As shown in FIG. 2, an embodiment of this disclosure further provides a terminal device 2, including:

a monitoring module 21, configured to monitor a PDCCH based on information of an activated target object, where the target object is a carrier or a cell.

Based on the terminal device in this embodiment of this disclosure, the PDCCH is monitored based on the information of the activated target object, the target object is the carrier or the cell, and a PDCCH processing capability of the terminal device can be allocated between activated target objects. In this way, a deactivated target object may be prevented from occupying the PDCCH processing capability of the terminal device, the PDCCH processing capability of the terminal device may be fully utilized, resource allocation control is maximized, a blocking probability of control channel allocation is reduced, and the processing capability of the terminal device is ensured not to be overwhelmed.

In an embodiment of this disclosure, optionally, the monitoring module 21 is specifically configured to:

when state change indication signaling of a first target object is received at a first moment, start monitoring the PDCCH from a second moment based on information of the activated target object after a state change of the first target object.

Optionally, the second moment is determined based on the first moment and at least one of the following:

state change delay of the first target object, response delay of the state change indication signaling, and first preset delay.

Optionally, the second moment is any of the following:

the first moment, a sum of the first moment and the state change delay, a response delay of the state change indication signaling, and a sum of the first moment, the response delay, and the state change delay.

Optionally, the state change indication signaling is any one of the following:

activation signaling, deactivation signaling, and signaling used to indicate a change of an activated downlink BWP of the first target object.

Optionally, the monitoring module 21 is specifically configured to:

when a state timer of a second target object expires at a third moment, start monitoring the PDCCH from a fourth moment based on information of the activated target object after a state change of the second target object.

Optionally, the fourth moment is determined based on the third moment and at least one of the following:

state change delay of the second target object and second preset delay.

Optionally, the fourth moment is:

the third moment or a sum of the third moment and the state change delay.

Optionally, the monitoring module 21 includes:

a determining module, configured to determine a PDCCH monitoring processing capability based on a quantity of activated target objects, where the PDCCH monitoring processing capability includes: a maximum PDCCH monitoring processing capability of the terminal device, and/or a maximum PDCCH monitoring processing capability for each target object in the activated target objects.

Optionally, when the activated target objects have same SCS, the maximum PDCCH monitoring processing capability of the terminal device may be:

$$\min(S,Y) \times P.$$

S is the quantity of activated target objects, Y is a supported blind detection capability reported by the terminal device, and P is a maximum quantity of PDCCH candidates that are to be blindly detected in a slot or a maximum quantity of non-overlapping control channel elements CCEs required by the terminal device to perform blind detection.

Optionally, when the activated target objects have different SCS, the maximum PDCCH monitoring processing capability of the terminal device may be:

$$\min\{S \times P, \lfloor Y \times P \times S^\mu / \Sigma_{\mu=0}^{3} S^\mu \rfloor\}$$

S is the quantity of activated target objects, Y is a supported blind detection capability reported by the terminal device, P is a maximum quantity of PDCCH candidates that are to be blindly detected in a slot or a maximum quantity of non-overlapping CCEs required by the terminal device to perform blind detection, $\mu$ is SCS configuration supported by the terminal device, and $S^\mu$ is a quantity of target objects of each SCS configuration $\mu$.

Optionally, the SCS of the activated target object is determined based on an activated downlink BWP of the activated target object.

Optionally, the monitoring module 21 includes:

a processing unit, configured to allocate and/or monitor a search space set and/or a PDCCH candidate of all activated target objects based on the quantity of activated target objects and/or a sequence of identifiers of the activated target objects.

Optionally, the monitoring module 21 is specifically configured to:

monitor the PDCCH on a search space set of a first activated cell when the first activated cell is not scheduled by another activated cell across carriers; or when a second activated cell is scheduled by another activated cell across carriers, monitor the PDCCH on a search space set that is of a scheduling cell of the second activated cell and that is associated with the second activated cell, and/or a PDCCH candidate that is associated with the second activated cell.

An embodiment of this disclosure further provides a terminal device, including a processor, a memory, and a computer program stored in the memory and capable of running on the processor. When the computer program is executed by the processor, the processes of the foregoing monitoring method embodiment are implemented, with the same technical effects achieved. To avoid repetition, details are not described herein again.

Figure 3:
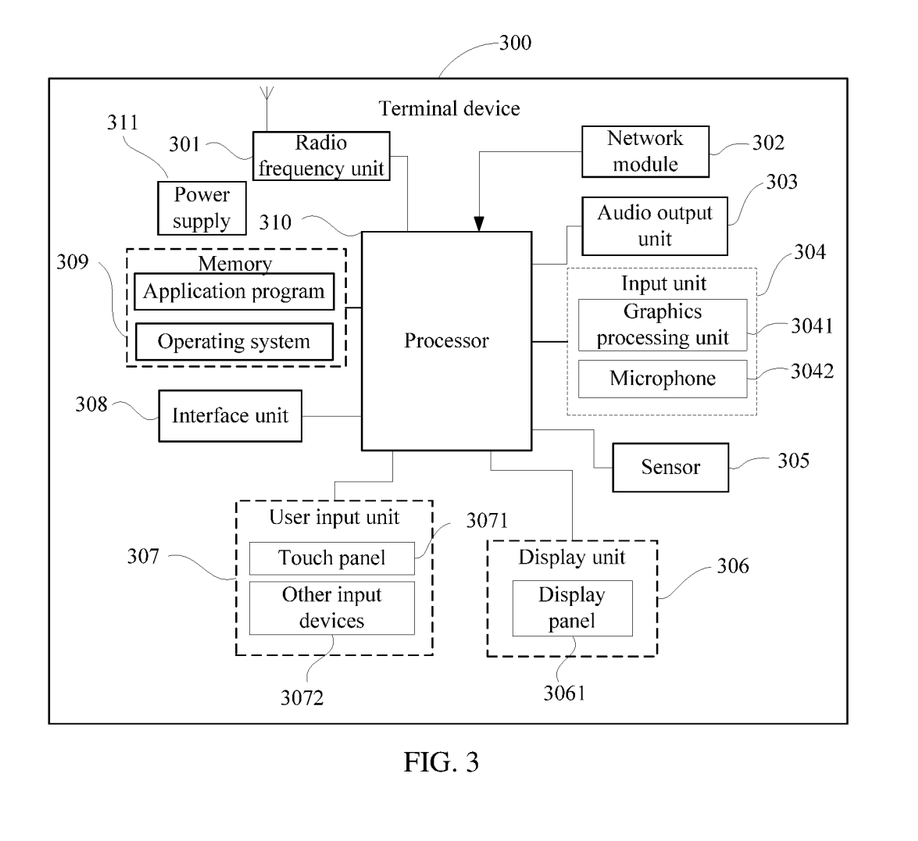
FIG. 3 is a schematic structural diagram 2 of a terminal device according to an embodiment of this disclosure.

Specifically, FIG. 3 is a schematic diagram of a hardware structure of a terminal device for implementing each embodiment of this disclosure. The terminal device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal shown in FIG. 3 does not constitute a limitation on the terminal. The terminal device may be include more or fewer components than those shown in the figure, or some components are combined, or component arrangements are different. In this embodiment of this disclosure, the terminal device includes but is not limited to a mobile phone, a tablet computer, a notebook computer, a palmtop computer, an in-vehicle terminal, a wearable device, a pedometer, and the like.

The processor 310 is configured to monitor a PDCCH based on information of an activated target object, where the target object is a carrier or a cell.

Based on the terminal device 300 in this embodiment of this disclosure, the PDCCH is monitored based on the information of the activated target object, the target object is the carrier or the cell, and a PDCCH processing capability of the terminal device can be allocated between activated target objects. In this way, a deactivated target object may be prevented from occupying the PDCCH processing capability of the terminal device, the PDCCH processing capability of the terminal device may be fully utilized, resource allocation control is maximized, a blocking probability of control channel allocation is reduced, and the processing capability of the terminal device is ensured not to be overwhelmed.

It should be understood that in this embodiment of this disclosure, the radio frequency unit 301 may be configured to: receive and send signals in an information receiving/sending process or a call process; and specifically, after receiving downlink data from a base station, send the downlink data to the processor 310 for processing, and send uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and other devices through a wireless communications system.

The terminal device provides wireless broadband Internet access for a user by using the network module 302, for example, helps the user send and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide an audio output (for example, a call signal reception sound or a message reception sound) related to a specific function performed by the terminal device 300. The audio output unit 303 includes a speaker, a buzzer, a phone receiver, and the like.

The input unit 304 is configured to receive an audio or video signal. The input unit 304 may include a graphics processing unit (Graphics Processing Unit, GPU) 3041 and a microphone 3042, and the graphics processing unit 3041 processes image data of a still picture or a video obtained by an image capture apparatus (for example, a camera) in a video capture mode or an image capture mode. A processed image frame may be displayed on the display unit 306. An image frame processed by the graphics processing unit 3041 may be stored in the memory 309 (or another storage medium) or sent by the radio frequency unit 301 or the network module 302. The microphone 3042 can receive a sound and can process the sound into audio data. The processed audio data can be converted, for outputting, into a format that can be sent to a mobile communication base station through the radio frequency unit 301 in a telephone call mode.

The terminal device 300 further includes at least one sensor 305, for example, an optical sensor, a motion sensor, and other sensors. Specifically, the optical sensor includes an ambient light sensor and a proximity sensor. The ambient light sensor may adjust luminance of a display panel 3061 based on brightness of ambient light. The proximity sensor may turn off the display panel 3061 and/or backlight when the terminal device 300 moves to an ear. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), and a function related to vibration recognition (for example, a pedometer or a keystroke), or the like. The sensor 305 may further include a fingerprint sensor, a pressure sensor, an iris sensor, a molecular sensor, a gyroscope, a barometer, a hygrometer, a thermometer, or an infrared sensor. Details are not described herein.

The display unit 306 is configured to display information input by the user or information provided for the user. The display unit 306 may include a display panel 3061, and the display panel 3061 may be configured in a form of a liquid crystal display (Liquid Crystal Display, LCD), an organic light-emitting diode (Organic Light-Emitting Diode, OLED), or the like.

The user input unit 307 may be configured to receive input digit or character information, and generate a key signal input related to a user setting and function control of the terminal. Specifically, the user input unit 307 includes a touch panel 3071 and other input devices 3072. The touch panel 3071, also referred to as a touchscreen, can collect a touch operation performed by a user on or near the touch panel (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 310, and receives and executes a command sent by the processor 310. In addition, the touch panel 3071 may be implemented in a plurality of types, for example, as a resistive type, a capacitive type, an infrared type, or a surface acoustic wave touch type. The user input unit 307 may further include other input devices 3072 in addition to the touch panel 3071. Specifically, the other input devices 3072 may include but are not limited to a physical keyboard, a function key (such as a volume control key or a power on/off key), a trackball, a mouse, a joystick, and the like. Details are not described herein.

Further, the touch panel 3071 may cover the display panel 3061. After detecting a touch operation on or near the touch panel 3071, the touch panel 3071 transmits the touch operation to the processor 310 to determine a type of a touch event. Then, the processor 310 provides a corresponding visual output on the display panel 3061 based on the type of the touch event. In FIG. 3, the touch panel 3071 and the display panel 3061 serve as two independent components to implement input and output functions of the terminal. However, in some embodiments, the touch panel 3071 and the display panel 3061 may be integrated to implement the input and output functions of the terminal. This is not specifically limited herein.

The interface unit 308 is an interface for connecting an external apparatus to the terminal device 300. For example, the external apparatus may include a wired or wireless headphone port, an external power supply (or a battery charger) port, a wired or wireless data port, a memory card port, a port for connecting an apparatus with an identification module, an audio input/output (I/O) port, a video I/O port, an earphone port, or the like. The interface unit 308 may be configured to receive an input (for example, data information or power) from an external apparatus, and transmit the received input to one or more components in the terminal device 300, or may be configured to transmit data between the terminal device 300 and an external apparatus.

The memory 309 may be configured to store software programs and various data. The memory 309 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 309 may include a high-speed random access memory, and may further include a non-volatile memory, for example, at least one magnetic disk storage device, a flash storage device, or other volatile solid-state storage devices.

The processor 310 is a control center of the terminal, is connected to various parts of the entire terminal by using various interfaces and lines, and executes various functions and data processing of the terminal by running or executing a software program and/or a module that is stored in the memory 309 and invoking data stored in the memory 309, so as to perform overall monitoring on the terminal. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the foregoing modem processor may alternatively not be integrated into the processor 310.

The terminal device 300 may further include the power supply 311 (such as a battery) for supplying power to the components. Optionally, the power supply 311 may be logically connected to the processor 310 through a power management system. In this way, functions such as charge management, discharge management, and power consumption management are implemented by using the power management system.

In addition, the terminal device 300 may further include some functional modules that are not illustrated. Details are not described herein.

An embodiment of this disclosure further provides a computer readable storage medium, where a computer program is stored in the computer readable storage medium. When being executed by a processor, the computer program implements processes of the foregoing monitoring method embodiments, and a same technical effect can be achieved. To avoid repetition, details are not described herein again. The computer-readable storage medium may be, for example, a read-only memory (Read-Only Memory, ROM), a random access memory (Random Access Memory, RAM), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A monitoring method, applied to a terminal device and comprising:
    monitoring a physical downlink control channel PDCCH based on information of an activated target object, wherein
    the target object is a carrier or a cell and a PDCCH processing capability of the terminal device is allocated between the activated target objects; and
    the method further comprises: determining a PDCCH monitoring processing capability based on a quantity of activated target objects, wherein
    the PDCCH monitoring processing capability comprises: a maximum PDCCH monitoring processing capability of the terminal device, and/or a maximum PDCCH monitoring processing capability for each target object in the activated target objects;
    when the activated target objects have different subcarrier spacings (SCS), the maximum PDCCH monitoring processing capability of the terminal device is:

$\min\{S \times P, \lfloor Y \times P \times S^\mu / \Sigma_{\mu=0}^{3} S^\mu \rfloor\}$, wherein S is the quantity of activated target objects, Y is a supported blind detection capability reported by the terminal device, P is a maximum quantity of PDCCH candidates that are to be blindly detected in a slot or a maximum quantity of non-overlapping CCEs required by the terminal device to perform blind detection, $\mu$ is SCS configuration supported by the terminal device, and $S^\mu$ is a quantity of target objects of each SCS configuration $\mu$.

2. The method according to claim 1, wherein the SCS of the activated target object is determined based on an activated downlink bandwidth part BWP of the activated target object and the PDCCH processing capability of the terminal device is associated with the SCS of the activated target object.

3. The method according to claim 1, wherein when state change indication signaling of a first target object is received at a first moment, the monitoring a physical downlink control channel PDCCH based on information of an activated target object comprises:
    starting monitoring the PDCCH from a second moment based on information of the activated target object after a state change of the first target object.

4. The method according to claim 3, wherein the second moment is determined based on the first moment and at least one of the following:
    state change delay of the first target object, response delay of the state change indication signaling, and first preset delay.

5. A terminal device, comprising a memory, a processor, and a computer program that is stored in the memory and capable of running on the processor, wherein the computer program is executed by the processor to implement:
monitoring a physical downlink control channel PDCCH based on information of an activated target object, wherein the target object is a carrier or a cell and a PDCCH processing capability of the terminal device is allocated between the activated target objects;
wherein the computer program is executed by the processor to further implement:
determining a PDCCH monitoring processing capability based on a quantity of activated target objects, wherein the PDCCH monitoring processing capability comprises: a maximum PDCCH monitoring processing capability of the terminal device, and/or a maximum PDCCH monitoring processing capability for each target object in the activated target objects;
when the activated target objects have different subcarrier spacings (SCS), the maximum PDCCH monitoring processing capability of the terminal device is:

$$\min\{S \times P, \lfloor Y \times P \times S^\mu / \Sigma_{\mu=0}^3 S^\mu \rfloor\}, \text{ wherein}$$

S is the quantity of activated target objects, Y is a supported blind detection capability reported by the terminal device, P is a maximum quantity of PDCCH candidates that are to be blindly detected in a slot or a maximum quantity of non-overlapping CCEs required by the terminal device to perform blind detection, $\mu$ is SCS configuration supported by the terminal device, and $S^\mu$ is a quantity of target objects of each SCS configuration $\mu$.

6. The terminal device according to claim 5, wherein when state change indication signaling of a first target object is received at a first moment, the computer program is further executed by the processor to implement:
starting monitoring the PDCCH from a second moment based on information of the activated target object after a state change of the first target object.

7. The terminal device according to claim 6, wherein the second moment is determined based on the first moment and at least one of the following:
state change delay of the first target object, response delay of the state change indication signaling, and first preset delay.

8. The terminal device according to claim 7, wherein the second moment is at least one of the following:
the first moment, a sum of the first moment and the state change delay, a response delay of the state change indication signaling, and a sum of the first moment, the response delay, and the state change delay.

9. The terminal device according to claim 6, wherein the state change indication signaling is at least one of the following:
activation signaling, deactivation signaling, and signaling used to indicate a change of an activated downlink bandwidth part BWP of the first target object.

10. The terminal device according to claim 5, wherein when a state timer of a second target object expires at a third moment, the computer program is further executed by the processor to implement:
starting monitoring the PDCCH from a fourth moment based on information of the activated target object after a state change of the second target object.

11. The terminal device according to claim 10, wherein the fourth moment is determined based on the third moment and at least one of the following:
state change delay of the second target object and second preset delay.

12. The terminal device according to claim 11, wherein the fourth moment is:
the third moment or a sum of the third moment and the state change delay.

13. The terminal device according to claim 5, wherein the SCS of the activated target object is determined based on an activated downlink bandwidth part BWP of the activated target object and the PDCCH processing capability of the terminal device is associated with the SCS of the activated target object.

14. The terminal device according to claim 13, wherein when the activated target objects have same subcarrier spacing SCS, the maximum PDCCH monitoring processing capability of the terminal device is:

$$\min(S, Y) \times P, \text{ wherein}$$

S is the quantity of activated target objects, Y is a supported blind detection capability reported by the terminal device, and P is a maximum quantity of PDCCH candidates that are to be blindly detected in a slot or a maximum quantity of non-overlapping control channel elements CCEs required by the terminal device to perform blind detection.

15. The terminal device according to claim 5, wherein the computer program is further executed by the processor to implement:
allocating and/or monitoring a search space set and/or a PDCCH candidate of all activated target objects based on the quantity of activated target objects and/or a sequence of identifiers of the activated target objects.

16. The terminal device according to claim 5, wherein the computer program is further executed by the processor to implement:
monitoring the PDCCH on a search space set of a first activated cell when the first activated cell is not scheduled by another activated cell across carriers; or
when a second activated cell is scheduled by another activated cell across carriers, monitoring the PDCCH on a search space set that is of a scheduling cell of the second activated cell and that is associated with the second activated cell, and/or a PDCCH candidate that is associated with the second activated cell.

17. A non-transitory computer-readable storage medium, wherein a computer program is stored in the computer-readable storage medium, and the computer program is executed by a processor to implement:
monitoring a physical downlink control channel PDCCH based on information of an activated target object, wherein the target object is a carrier or a cell and a PDCCH processing capability of the terminal device is allocated between the activated target objects;
wherein the computer program is executed by the processor to further implement:
determining a PDCCH monitoring processing capability based on a quantity of activated target objects, wherein the PDCCH monitoring processing capability comprises: a maximum PDCCH monitoring processing capability of the terminal device, and/or a maximum PDCCH monitoring processing capability for each target object in the activated target objects;
when the activated target objects have different subcarrier spacings (SCS), the maximum PDCCH monitoring processing capability of the terminal device is:

$$\min\{S \times P, \lfloor Y \times P \times S^\mu / \Sigma_{\mu=0}^3 S^\mu \rfloor\}, \text{ wherein}$$

S is the quantity of activated target objects, Y is a supported blind detection capability reported by the terminal device, P is a maximum quantity of PDCCH candidates that are to be blindly detected in a slot or a maximum quantity of non-overlapping CCEs required by the terminal device to perform blind detection, $\mu$ is SCS configuration supported by the terminal device, and $S^\mu$ is a quantity of target objects of each SCS configuration $\mu$.

18. The computer-readable storage medium according to claim 17, wherein the SCS of the activated target object is determined based on an activated downlink bandwidth part BWP of the activated target object and the PDCCH processing capability of the terminal device is associated with the SCS of the activated target object.

19. The computer-readable storage medium according to claim 17, wherein when state change indication signaling of a first target object is received at a first moment, the computer program is executed by the processor to further implement:

starting monitoring the PDCCH from a second moment based on information of the activated target object after a state change of the first target object.

20. The computer-readable storage medium according to claim 19, wherein the second moment is determined based on the first moment and at least one of the following:

state change delay of the first target object, response delay of the state change indication signaling, and first preset delay.

* * * * *